US007923511B2

(12) United States Patent
Aasetre et al.

(10) Patent No.: US 7,923,511 B2
(45) Date of Patent: Apr. 12, 2011

(54) POLYPROPYLENE COMPOSITIONS

(75) Inventors: Sveinung Aasetre, Stathelle (NO); Thor Kamfjord, Brevik (NO)

(73) Assignee: Borealis Technology OY, Porvoo (FI)

( * ) Notice: Subject to any disclaimer, the term of this patent is extended or adjusted under 35 U.S.C. 154(b) by 238 days.

(21) Appl. No.: 12/278,242

(22) PCT Filed: Feb. 13, 2007

(86) PCT No.: PCT/EP2007/001228
§ 371 (c)(1),
(2), (4) Date: Aug. 22, 2008

(87) PCT Pub. No.: WO2007/093376
PCT Pub. Date: Aug. 23, 2007

(65) Prior Publication Data
US 2009/0118415 A1    May 7, 2009

(30) Foreign Application Priority Data

Feb. 14, 2006 (EP) .................................. 06250774

(51) Int. Cl.
*C08F 8/00* (2006.01)
*C08L 23/00* (2006.01)

(52) U.S. Cl. .................... 525/191; 525/193; 525/240

(58) Field of Classification Search .................. 525/191, 525/193, 240
See application file for complete search history.

(56) References Cited

U.S. PATENT DOCUMENTS

| 4,551,501 A | 11/1985 | Shiga et al. |
| 6,437,063 B1 | 8/2002 | Karbasi et al. |
| 6,503,993 B1 | 1/2003 | Huovinen et al. |

FOREIGN PATENT DOCUMENTS

| EP | 0 151 883 | 8/1985 |
| EP | 1 607 438 | 12/2005 |
| EP | 1 759 833 | 3/2007 |
| WO | WO 99/24501 | 5/1999 |
| WO | WO 99/24503 | 5/1999 |
| WO | WO 00/68315 | 11/2000 |
| WO | WO 01/36502 | 5/2001 |
| WO | WO 02/072693 | 9/2002 |
| WO | WO 2004/055101 | 7/2004 |

OTHER PUBLICATIONS

International Search Report dated Apr. 3, 2007.

*Primary Examiner* — Nathan M Nutter
(74) *Attorney, Agent, or Firm* — Knobbe, Martens, Olson & Bear, LLP

(57) ABSTRACT

A polymer composition having (i) 0.01 to 50% wt (e.g. 0.05 to 15% wt) of a propylene polymer with a polymeric nucleating agent is disclosed. Preferably, the agent contains vinyl compound units and (ii) a heterophasic propylene polymer which includes less (or no) polymeric nucleating agent than the propylene polymer in (i).

17 Claims, 3 Drawing Sheets

POLYPROPYLENE COMPOSITIONS

CROSS-REFERENCE TO RELATED APPLICATIONS

This application is the U.S. National Phase under 35 U.S.C. §371 of International Application PCT/EP2007/001228, filed Feb. 13, 2007, which claims priority to EP 06250774.4, filed Feb. 14, 2006.

BACKGROUND OF THE INVENTION

1. Field of the Invention
2. Description of the Related Art

The present invention relates to polymer compositions and in particular to compositions that are suitable for the preparation of articles, especially thin walled articles, by moulding, thermoforming and extrusion. The invention also concerns processes for preparing such articles and to the resulting articles per se.

Propylene polymers, especially heterophasic propylene polymers, have excellent mechanical properties, therefore polypropylene is the polymer of choice for the production of many types of article (e.g. containers, lids, pails, crates, boxes, buckets, etc.) To provide polypropylene articles having, for example, high impact resistance and rigidity, polypropylene is often used in conjunction with a nucleating agent that serves to increase its crystallinity by increasing the rate of crystallisation. Various different nucleating agents have been used including aromatic carboxylic acids, aromatic metal phosphates and sorbitol derivatives.

Another agent that is known to have a nucleating effect is a polymer of vinyl cyclohexane. EP-A-0151883, for example, discloses a propylene polymer composition comprising crystalline polypropylene and a polymer of a vinyl cycloalkane and teaches that, unlike other nucleating agents, the use of polymers of vinyl cycloalkanes improves both the crystallinity and the transparency of final products. The examples of EP-A-0151883 show that sheets comprising a crystalline polypropylene and a polymer of a vinyl cycloalkane have a low light scattering index, low haze and high gloss compared to sheets prepared solely from polypropylene.

U.S. Pat. Nos. 6,503,993 and 6,437,063 also disclose propylene polymer compositions comprising a polymer of a vinyl cycloalkane. U.S. Pat. No. 6,503,993, for example, discloses a polypropylene nucleated with 0.001 to 1% wt of a polymerised vinyl compound and teaches that it may be blended with 5-30% wt rubbery copolymer or other polymers. The resulting compositions are said to exhibit higher shrinkage than conventional polypropylene containing talc but within the tolerance limits of many manufacturers.

WO 99/24501 discloses, however, that whilst the crystallisation properties of polymers comprising polymers of vinyl cycloalkanes are excellent, that compositions comprising such polymers exhibit high levels of shrinkage. More specifically it has been found that these compositions have a tendency, after moulding, thermoforming and/or extrusion, to undergo significantly increased amounts of shrinkage during cooling compared to their counterparts that do not contain a polymer of vinyl cycloalkane.

Moreover the extent of shrinkage in polymer compositions comprising polymers of vinyl cycloalkane has been found to vary with, amongst other factors, the size of the resulting article. Such variable shrinkage is highly undesirable since it precludes the use of such compositions for the production of articles where their final dimensions are critical. This is the case, for example, with containers (e.g. pails) and lids, caps or closures that are required to fit together. Manufacturers of such articles therefore tend to have low shrinkage "tolerances" (i.e. the level of shrinkage should be low so that any differences are minimised).

To try to control shrinkage of polypropylene compositions comprising polymers of vinyl cycloalkane. WO 99/24501 teaches the use of talc. More specifically WO 99/24501 describes polypropylene compositions comprising polypropylene comprising a polymer of vinyl cycloalkane and 0.1 to 10% talc. It is also shown in WO 99/24501 that articles formed from these compositions have improved stiffness, a higher tensile modulus and an increased Heat Deflection Temperature than those compositions wherein the polymeric nucleating agent is absent.

The compositions described in WO 99/24501 are prepared by processes wherein a propylene polymer comprising a polymer of vinyl cycloalkane is first prepared and then mixed with talc. For example, a vinyl cycloalkane compound may first be polymerised in the presence of a propylene polymerisation catalyst to prepare a modified catalyst that is used in the polymerisation of propylene. Alternatively propylene polymer and a polymer of vinyl cycloalkane can be prepared separately and mixed by, for example, melt kneading. In both cases, talc is added in the last stage of the process.

Whilst the processes described in WO 99/24501 provide propylene having desirable properties, they require the addition of talc as well as fairly high amounts (e.g. up to 10,000 ppm wt) of the polymer of a vinyl cycloalkane. The polymer of a vinyl cycloalkane is, however, relatively expensive.

SUMMARY OF THE INVENTION

A need therefore exists for alternative polypropylene compositions that possess good crystallisation properties (e.g. a high crystallisation temperature and/or a high rate of crystallisation) as well as controlled shrinkage but which are simple and cheap to make. It has now been surprisingly found that propylene compositions having these advantageous properties may be made by mixing a heterophasic polypropylene with a small quantity of a polypropylene comprising a vinyl compound.

Thus viewed from one aspect the invention provides a polymer composition comprising:

(i) 0.01-50% wt (e.g. 0.05 to 15% wt) of a propylene polymer comprising a polymeric nucleating agent, said agent preferably containing vinyl compound units; and (ii) a heterophasic propylene polymer which comprises less (e.g. no) polymeric nucleating agent than the propylene polymer in (i).

In a preferred embodiment, the present invention provides a polymer composition comprising:

(i) 0.01-50% wt (e.g. 0.05 to 15% wt) of a propylene polymer comprising a polymeric nucleating agent, said agent preferably containing vinyl compound units; and (ii) a heterophasic propylene polymer which does not comprise a polymeric nucleating agent.

In preferred compositions of the present invention the heterophasic propylene polymer does not have a melt index of 45 as measured according to JIS K-6758 and a flexural modulus of 12,000 kg/cm$^2$ as measured according to ASTM D790-66 on a sample having a thickness of 5.0 mm obtained by compression moulding according to JIS K-6758. Further preferred compositions do not contain 7 wt ppm of polymeric nucleating agent. Particularly preferred compositions do not contain 7 wt ppm of polymeric nucleating agent or a heterophasic propylene polymer that has a melt index of 45 as measured according to JIS K-6758 and a flexural modulus of 12,000 kg/cm² as measured according to ASTM D790-66 on a sample having a thickness of 5.0 mm obtained by compression moulding according to JIS K-6758.

As used herein, the term "heterophasic" denotes a polymer comprising at least two phases (e.g. a crystalline phase and an amorphous phase). Preferred heterophasic propylene polymers for use in the invention comprise at least 50 wt %, more preferably at least 65 wt %, still more preferably at least 75 wt % crystalline phase, e.g. at least 80 wt % crystalline phase. Preferably the crystalline phase does not comprise more than 95 wt % of the heterophasic propylene polymers, e.g. not more than 90 wt %.

Viewed from a further aspect the invention provides a process for preparing a polymer composition as hereinbefore described comprising blending: (i) 0.01-50% wt (e.g. 0.05 to 15% wt) of a propylene polymer comprising a polymeric nucleating agent, said agent preferably containing vinyl compound units, and (ii) a heterophasic propylene polymer which comprises less (e.g. no) polymeric nucleating agent than the propylene polymer in (i).

Viewed from a further aspect the invention provides use of a polymer composition as hereinbefore described in moulding, thermoforming or extrusion, preferably moulding.

Viewed from a yet further aspect the invention provides an article comprising a composition as hereinbefore described.

Viewed from a still further aspect the invention provides a process for preparing an article comprising moulding, thermoforming or extruding a composition as hereinbefore described.

Viewed from a further aspect the invention provides use of a propylene polymer comprising a polymeric nucleating agent, said agent preferably containing vinyl compound units, to control shrinkage in an article, wherein said article comprises a composition as hereinbefore defined and is prepared by moulding, thermoforming or extrusion.

DETAILED DESCRIPTION OF THE PREFERRED EMBODIMENT

Figure 1:
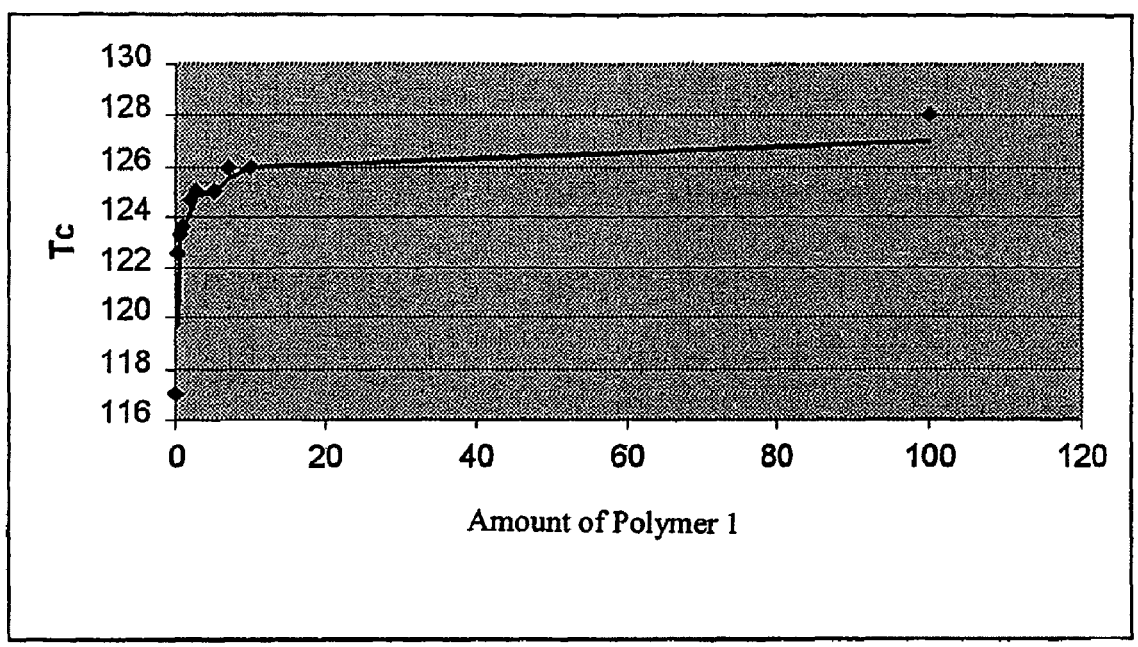
FIG. 1 shows the crystallization temperature versus amount of polymer 1 (%) for an injected molded bucket.

The polymer compositions of the present invention therefore comprise at least two (e.g. two) different components, namely (i) and (ii) as hereinbefore defined. Preferably the components have different crystallisation temperatures (Tc). Still more preferably the propylene polymers present within each component are different. The polymers may be different in any way, e.g. in comonomer content, Tc, MWD, MFR$_2$, crystallinity etc.

The propylene polymer which comprises a polymeric nucleating agent may be a homopolymer or a copolymer (e.g. a random or block copolymer). As used herein the term homopolymer is intended to encompass polymers which consist essentially of repeat units deriving from a single monomer. Homopolymers, may for example, comprise at least 80%, preferably at least 90%, more preferably at least 95% (e.g. about 99%) by weight of repeat units deriving from a single monomer.

As used herein the term copolymer is intended to encompass polymers comprising repeat units from two or more monomers. In typical copolymers at least 1%, preferably at least 5%, e.g. at least 10% by weight of repeat units derive from each of at least two different monomers.

Preferably the propylene polymer comprising the polymeric nucleating agent is a copolymer, especially a block copolymer. Copolymers may comprise other α-olefins having 2 to 18 carbon atoms. Examples of suitable monomers include ethylene, but-1-ene, pent-1-ene, hex-1-ene and oct-1-ene, especially ethylene. The total amount of any α-olefin that is copolymerised with propylene may be up to 50 mol %, e.g. up to 20 mmol %. Particularly preferably the propylene polymer comprising the polymeric nucleating agent is a heterophasic copolymer as hereinafter defined.

The polymer composition of the invention further comprises a polymeric nucleating agent. Any conventional polymeric nucleating agent may be used, e.g. polymers derived from vinyl cycloalkanes and/or vinyl alkanes. Preferably the polymeric nucleating agent contains vinyl compound units.

A polymeric nucleating agent containing vinyl compound units may be a homopolymer of a vinyl compound, a copolymer of different vinyl compounds or a copolymer of a vinyl compound and an α-olefin. The copolymers may be random or block copolymers. α-Olefins which may be copolymerised with the vinyl compound may comprise 2 to 8 carbon atoms (e.g. ethylene, propylene and but-1-ene). Propylene is particularly preferred. The amount of any α-olefin which may be copolymerised with the vinyl compound may be up to 30 mol %, e.g. up to 10 mol %. Preferably the polymeric nucleating agent is a homopolymer of a vinyl compound.

Preferred polymeric nucleating agents present in the compositions of the present invention comprise vinyl compound units deriving from a vinyl compound of formula (I):

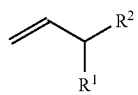

wherein R¹ and R², together with the carbon atom they are attached to, form an optionally substituted, fused ring system or saturated, unsaturated or aromatic ring, wherein said ring system or ring comprises 4 to 20 carbon atoms (e.g. 5 to 12 carbon atoms) or R¹ and R² independently represent a linear or branched C$_{4-30}$ alkane, a C$_{4-20}$ cycloalkane or a C$_{4-20}$ aromatic ring.

Preferably R¹ and R², together with the carbon atom they are attached to, form an optionally substituted, optionally C$_{1-2}$ bridged, 5 or 6 membered saturated, unsaturated or aromatic ring or R¹ and R² independently represent a C$_{1-4}$ alkyl group.

In further preferred compounds of formula (I), R¹ and R², together with the carbon atom they are attached to, form a 6 membered ring. Still more preferably R¹ and R², together with the carbon atom they are attached to, form a non-aromatic ring (i.e. a vinyl cycloalkane). In particularly preferred compounds the ring formed by R¹ and R², together with the carbon atom they are attached to, is unsubstituted.

Representative examples of vinyl compounds which may be present in the polymeric nucleating agent used in the present invention include vinyl cyclohexane, vinyl cyclopentane, vinyl-2-methyl cyclohexane, 3-methyl-1-pentene, 4-methyl-1-pentene, 3-methyl-1-butene, 3-ethyl-1-hexene or a mixture thereof. Vinyl cyclohexane is a particularly preferred vinyl compound.

The propylene polymer comprising the polymeric nucleating agent may be made by any conventional method known in the art, e.g. according to the methods described in WO99/24501. Thus polypropylene as hereinbefore described may be blended with polymers containing vinyl compound units. More preferably, however, the propylene polymers are made by modifying a polymerisation catalyst with vinyl compounds as hereinbefore described and using the modified catalyst for the polymerisation of propylene, optionally in the presence of comonomers. The catalyst systems and reaction conditions suitable for application in this latter method are described in WO99/24501. For instance, examples 1 and 2 described therein disclose a specific procedure which may be used to prepare a propylene polymer comprising a polymeric nucleating agent for use in the compositions of the present invention.

The resulting propylene polymers preferably comprise 1 to 10,000 ppm wt of polymeric nucleating agent, more preferably 10 to 5,000 ppm wt of polymeric nucleating agent.

The propylene polymer comprising a polymeric nucleating agent preferably has a crystallisation temperature of greater than 7° C., preferably greater than 10° C. and in particular greater than 13° C. compared to the $T_c$ of the corresponding propylene polymer wherein the nucleating agent is present in a lesser amount or is absent. Further preferred polymers comprising a polymeric nucleating agent have a molecular weight distribution of 1 to 50, preferably 2 to 10. Further preferred propylene polymers comprising a polymeric nucleating agent have a $MFR_2$ in the range 0.01 to 1000 g/10 min, more preferably 0.05 to 500 g/10 min as measured by ISO 1133 at 230° C., 2.16 kg load. Although the propylene polymer comprising a polymeric nucleating agent may have a unimodal molar mass distribution, it is preferred if the molar mass distribution is bimodal.

The heterophasic propylene polymer(s) present in the compositions of the present invention may comprise a propylene polymer matrix and an elastomer. The matrix polymer must contain at least one polypropylene. The matrix polymer may contain two or more propylene polymers, e.g. polymers with different monomer compositions and/or different molecular weight distributions. Preferably the matrix polymer comprises propylene homopolymer or a mixture thereof with a random propylene copolymer. When the matrix polymer comprises a copolymer, the comonomers may include any monomers copolymerisable with propylene, e.g. $C_{2-20}$ unsaturated monomers. Preferred monomers include ethylene, but-1-ene and hex-1-ene. The comonomer content is preferably 0 to 5 wt. %, e.g. 1 to 4 wt %. More preferably the matrix polymer is propylene homopolymer.

The matrix polymer may be produced by any conventional procedure known in the art. For example, the matrix polymer may be produced in a polymerisation reaction carried out in one or more reactors or by blending two or more compatible polymers. Preferably a matrix polymer comprising two or more different propylene polymers is produced by the use of two or more catalyst types in a one-reactor polymerisation or alternatively by carrying out polymerisation in two or more polymerisation reactors (e.g. loop and/or gas phase reactors) or zones. This latter approach is preferred. Particularly preferably the matrix polymer is produced in a polymerisation process using a Ziegler-Natta catalyst system, especially a supported Ziegler-Natta catalyst system. Metallocene catalysts may also be used.

The matrix polymer preferably comprises 50 to 95%, preferably 65 to 90%, more preferably 70 to 80%, by weight of the heterophasic polypropylene polymer.

The elastomer present in the heterophasic polymer is preferably an α-olefin polymer, in particular a propylene polymer, more particularly a propylene copolymer with one or more copolymerisable monomers. Representative examples of comonomers include $C_2$ and $C_{4-20}$ α-olefins, e.g. ethylene, but-1-ene and hex-1-ene. Ethylene is particularly preferred. The comonomer content of the elastomer is preferably 20-60% wt, preferably 25-50% wt, e.g. 30-45% wt.

The molecular weight of elastomers may be measured indirectly by measurement of the intrinsic viscosity of the xylene soluble amorphous fraction (AM). The elastomer preferably has an intrinsic viscosity (IV of AM) measured in accordance with the method described hereinafter of 1-6 dL/g, more preferably 1.5-5.5 dL/g, e.g. 2.0-5.0 dL/g.

As with the matrix polymer, the elastomer may be produced by any conventional techniques. Preferably, however, the elastomer is synthesised using a supported catalyst system, e.g. a supported Ziegler-Natta system.

The elastomer preferably comprises 5 to 50% wt, preferably 10 to 35% wt, more preferably 20 to 30% wt of the heterophasic polypropylene.

The elastomer may be blended With the matrix polymer. More preferably, however, the elastomer is produced by performing a second polymerisation stage in the presence of particles of matrix polymer, e.g. as a second polymerisation stage of a multistage polymerisation. Preferably the heterophasic polymer is produced in a two stage polymerisation using two or more polymerisation reactors, more preferably using loop and gas phase reactors. In such a procedure, the catalyst system used may be varied between stages but is preferably the same for all stages. Especially preferably a prepolymerised heterogeneous (i.e. supported) catalyst is used. Whilst the catalyst may be a metallocene, it is preferred to use Ziegler Natta catalysts, e.g. an inorganic halide (e.g. $MgCl_2$) supported titanium catalyst, together with an aluminium alkyl (e.g. triethylaluminium) cocatalyst. Such catalyst systems are well known in the art. When the heterophasic polymer is to be used as the polypropylene polymer comprising a polymeric nucleating agent, the catalyst used may of course be modified with vinyl compounds as hereinbefore described.

The $MFR_2$ of the heterophasic polymers of the invention is preferably 0.1-150 g/10 min, more preferably 0.25-100 g/10 min (e.g. 4-44 or 46-100 g/10 min), still more preferably 4-75 g/10 min, e.g. about 4-44 g/10 min.

The polymer compositions of the present invention may also contain any conventional additives (e.g. heat and light stabilisers, colourants, antistatic agents, antioxidants, carbon black, pigments, flame retardants etc.). A filler (e.g. talc) may also be present. Particularly preferred polymer compositions of the present invention comprise 0.01 to 10 wt % talc, more preferably 1 to 7 wt % talc, e.g. about 0.5 to 5 wt % talc. Still more preferably the propylene polymer comprising a polymeric nucleating agent comprises talc. The talc preferably has a particle size in the range 0.01 to 100 µm, more preferably 0.1 to 10 µm.

The polymer compositions of the present invention may be prepared by any methods known in the art, e.g. by mixing the components hereinbefore described. Batch or continuous processes may be used. A Banbury type mixer may, for example, be used in a batch process. The Farrel, the Buss co-kneader and single- or twin-screw extruders may be used in a continuous process.

The polymer compositions preferably comprise (i) a propylene polymer comprising a polymeric nucleating agent as hereinbefore defined and (ii) a heterophasic propylene polymer as hereinbefore defined in a weight ratio of at least 40:60

(e.g. 40:60 to 0.5 to 99.5). More preferably the weight ratio of (i):(ii) is at least 20:80 (e.g. 20:80 to 1:99), still more preferably about 10:90 (e.g. about 5:95 to 0.3:99.7).

Preferred polymer compositions of the present invention comprise 0.01 to 100 ppm wt of a polymeric nucleating agent, more preferably 0.1 to 20 ppm wt of polymeric nucleating agent, still more preferably 0.5 to 6 ppm wt, e.g. about 0.6 to 3.2 ppm wt. Further preferred compositions comprise 0.05 to 15 wt %, more preferably 0.1 to 10 wt %, still more preferably 0.2 to 10 wt %, e.g. 0.5 to 7 wt % of a propylene polymer comprising a polymeric nucleating agent as hereinbefore defined. The polymer compositions of the present invention preferably also comprise 85 to 99.95% wt of (ii), more preferably 90 to 99.8% wt of (ii), yet more preferably 93 to 99.5% wt of (ii). Particularly preferred compositions of the present invention consist essentially of (e.g. consist of) (i) and (ii) and optionally talc.

The polymer compositions of the present invention have a number of advantageous properties that render them especially suitable for use in the manufacture of moulded articles. Moulded articles comprising the compositions of the invention are preferably formed by blow moulding, thermoforming, injection moulding, compression moulding or extrusion (e.g. sheet, film, pipe or cable extrusion). Injection moulding is a particularly preferred method.

In the preparation of moulded articles it is important that during solidification (e.g. during crystallisation) of the melted polymer that the dimensions of the article do not substantially change. This is particularly important in articles that are intended to connect to, or engage with, other optionally moulded articles (e.g. lids, caps and closures and the corresponding containers). At the same time, it is advantageous that the crystallisation rate is not too low so that the throughput of moulded articles can be maximised.

One advantage of the polymer compositions of the present invention is that they undergo less shrinkage than compositions solely comprising polypropylene comprising a polymeric nucleating agent, yet still solidify (e.g. crystallise) in a comparable manner thereto. Thus the polymer compositions of the present invention afford increased control over shrinkage without substantially affecting moulding throughput. Articles comprising the compositions of the invention are therefore cheaper and easier to make than articles of the nucleated propylene compositions previously described.

Preferred polymer compositions of the invention include those having a rate of crystallisation ($T_{0.5}$) which is at least 50%, preferably at least 70% (e.g. at least 80%) of the rate of crystallisation of the polypropylene comprising the polymeric nucleating agent present therein. Further preferred compositions include those having a crystallisation temperature (Tc) which is at least 85%, preferably at least 88% (e.g. at least 90%) of the crystallisation temperature of the polypropylene comprising the polymeric nucleating agent present therein. Preferred compositions also include those having a lower melting temperature (Tm) than the polypropylene comprising the polymeric nucleating agent present therein. The Tm is preferably at least 1° C., more preferably at least 1.5° C. less than the Tm of the polypropylene comprising the polymeric nucleating agent present therein.

In particularly preferred polymer compositions and articles of the invention the amount of shrinkage is preferably less than the amount of shrinkage of the propylene polymer comprising the polymeric nucleating agent present therein. More preferably the amount of shrinkage as determined by the methods described hereinafter in the flow direction is less than 1.60%, more preferably less than 1.59%. The amount of shrinkage in the cross direction as determined by the methods described hereinafter is preferably less than 1.69%, more preferably less than 1.62%.

Articles moulded using polymer compositions of the present invention also have desirable properties (e.g. mechanical properties). It has surprisingly been found that articles comprising the compositions of the invention exhibit a significantly higher tensile modulus, top load strength and heat deflection temperature than the heterophasic polypropylene present therein alone.

Even more surprisingly articles comprising the compositions of the invention also show comparable properties to the polypropylene comprising a polymeric nucleating agent present therein. In particularly preferred cases, articles comprising the compositions of the invention also show improved properties compared to the polypropylene comprising a polymeric nucleating agent present therein. In other words, the inclusion of only a relatively small amount (e.g. 0.2-10 wt %) of polypropylene comprising a polymeric nucleating agent has an expected beneficial affect, in some cases a synergistic affect, on the afore-mentioned properties of the resulting articles.

Preferred articles comprising polymer compositions of the present invention have a tensile modulus that is greater than the tensile modulus of the heterophasic propylene polymer and/or the propylene polymer comprising a polymeric nucleating agent present therein. Preferred articles have a tensile modulus of at least 1200 MPa, more preferably at least 1350 MPa, e.g. at least 1400 MPa.

Further preferred articles have a heat deflection temperature that is greater than the heat deflection temperature of the heterophasic propylene polymer and/or the propylene polymer comprising a polymeric nucleating agent present therein. Particularly preferred articles have a heat deflection temperature of at least 92° C., more preferably at least 94° C., e.g. at least 95° C.

Yet further preferred articles have a top load strength that is greater than the top load strength of the heterophasic propylene polymer and/or the propylene polymer comprising a polymeric nucleating agent present therein. Particularly preferred articles have a top load strength of at least 5100, more preferably at least 5200 e.g. at least 5300.

The invention will now be further illustrated by the following non-limiting examples.

EXAMPLES

Test Procedures:

Values quoted in the description/examples are measured according to the following tests unless otherwise stated:

Melting temperature (Tm), crystallisation temperature (Tc) and degree of crystallinity (Xc) were measured according to ISO 11357 except that the rate of heating/cooling was 10° C./min. The measurements were performed under the conditions shown in the Table below. The measurements were made on samples cut from compression moulded 0.2 mm films.

| Stage | Temperature Program | Heating/Cooling Rate ° C./min | Time min |
|---|---|---|---|
| 1st heating | 20-225° C. | 10 | |
| Isothermal | 225° C. | | 5 |
| Cooling | 225-20° C. | −10 | |

-continued

| Stage | Temperature Program | Heating/Cooling Rate ° C./min | Time min |
|---|---|---|---|
| Isothermal | 20 | | 1 |
| 2$^{nd}$ heating | 20-225° C. | 10 | |

The Tm and Xc were determined from the second heating. The degree of crystallinity (Xc) was calculated using a melting enthalpy of 100% PP equal to 209 J/g.

Tensile strain at yield and tensile modulus was measured on specimens according to ISO3167 (Multipurpose test specimen, type A (injection moulded)) according to ISO 527-2:1993. The modulus was measured at a speed of 50 mm/min.

Top Load Strength. The compression test used to measure the rigidity of 25 liter buckets followed the method of standard test ASTM 2659-95 on a Zwick tensile machine operated at a velocity of 10 mm/min.

Heat Deflection Temperature was measured according to ISO-75-2: Method B.

Intrinsic viscosity was measured in accordance with ISO 1628.

MFR$_2$ was measured in accordance with ISO 1133 (230° C., 2.16 kg load).

The weight average molecular weight, Mw and the molecular weight distribution (MWD=Mw/Mn wherein Mn is the number average molecular weight) is measured by a method based on ISO 16014-4:2003. A waters 150CV plus instrument was used with column 3×HT&E styragel from Waters (divinylbenzene) and trichlorobenzene (TCB) as solvent at 140° C. The column set was calibrated using universal calibration with narrow MWD PS standards (the Mark Hoiwinks constant K: 9.54×10$^{-5}$ and a: 0.725 for PS, and K: 3.92×10$^{-4}$ and a: 0.725 for PE).

Comonomer content (weight percent) was determined in a known manner based on FTIR, calibrated with C13NMR The xylene soluble fraction (XS) was determined as follows:

2.0 g of polymer are dissolved in 250 mm p-xylene at 135° C. under agitation. After 30±minutes, the solution was allowed to cool for 15 minutes at ambient temperature and then allowed to settle for 30 minutes at 25±0.5° C. The solution was filtered with filter paper into two 100 mm flask. The solution from the first 100 mm vessel was evaporated in nitrogen flow and the residue dried under vacuum at 90° C. until constant weight is reached. Xylene soluble fraction (percent) can then be determined as follows:

XS %=(100×m$_1$×v$_0$)/(m$_0$×v$_1$), wherein m$_0$ designates the initial polymer amount (grams), m$_1$ defines the weight of residue (grams), v$_0$ defines the initial volume (milliliter) and v$_1$ defines the volume of analyzed sample (milliliter).

The solution from the second 100 ml flask was treated with 200 ml of acetone under vigorous stirring. The precipitate was filtered and dried in a vacuum oven at 90° C. This solution can be employed in order to determine the amorphous part of the polymer (AM) using the following equation:

AM %=(100×$m_1$×$v_0$)/($m_0$×$v_1$)

wherein m$_0$ designates the initial polymer amount (grams), m$_1$ defines the weight of residue (grams), v$_0$ defines the initial volume (milliliter) and v$_1$ defines the volume of analyzed sample (milliliter).

Shrinkage was measured on injection moulded specimens. For buckets, the dimensions of the final, cooled, bucket were measured and compared to the dimensions of the mould used to make it.

For boxes, the material was injection moulded at Netstal 1570/300 MPS injection moulding machine at 230° C. with an injection speed of 100 mm/s, a holding pressure to 315 grams product weight of box and a holding time of 12 s. Dosing at backpressure of 100 bar and 150 rpm. The mould temperature was 30° C. on injection side and 15° C. on clamping side. The cooling time was 15 s.

A tool box of 315 grams was moulded with one inlet and dimensions 380 mm×190 mm×100 mm, wall thickness 2 mm. The mould had a grid system in the bottom. The samples were therefore measured after 48 hours using a digital reading instrument (DRC600) in flow direction, called X over 120 mm, and across the flow direction called Y, over 80 mm. Shrinkage was then calculated in percent of original mould area.

Examples 1 and 2

Preparation of Propylene Polymers Comprising a Polymeric Nucleating Agent

Heterophasic propylene polymers comprising a polymeric nucleating agents containing vinyl cyclohexane were prepared according to the method described in Example 6 of WO00/68315 but having the properties set out in the Table below. The polymers contain 320 ppm of polyVCH.

| | Unit | Polymer 1 | Polymer 2 |
|---|---|---|---|
| MFR$_2$ (230° C., 2.15 kg) | g/10 min | 12 | 20* |
| Total ethylene | wt. % | 7.4 | 5.6 |
| Xylene solubles | wt. % | 20 | 15 |
| Amorphous part | wt. % | 20 | 15 |
| Ethylene in amorphous part | wt. % | 37 | 38 |
| Intrinsic viscosity of rubber | dl/g | 2.5 | 2.7 |
| Crystallisation temperature | ° C. | 128 | 129 |
| Melting point | ° C. | | 165.5 |
| Talc | wt. % | 0.7 | 0 |

*In the case of Polymer 2, the polymer was then visbroken according to conventional techniques with peroxide Trigonox 101. The resulting polymer has an MFR$_2$ of 50 g/10 min Example 3

Preparation of a Composition

Heterophasic polymers which do not comprise polymeric nucleating agent and having the properties set out in the Table below were prepared according to conventional techniques (e.g. as described in EP1244717)

| | Unit | Polymer 3 | Polymer 4 |
|---|---|---|---|
| MFR$_2$ (230° C., 2.15 kg) | g/10 min | 12 | 45 |
| Total ethylene | wt. % | 5.7 | 5.7 |
| Xylene solubles | wt. % | 15 | 15 |
| Amorphous part | wt. % | 15 | 15 |
| Ethylene in amorphous part | wt. % | 38 | 38 |
| Intrinsic viscosity of rubber | dl/g | 2.4 | 2.2 |
| Crystallisation temperature | ° C. | 117 | 123 |
| Melting point | ° C. | 163 | 164 |
| Talc | wt. % | 0 | 0.5 |

The polymers listed below were then dry-blended, pellet with pellet, in a small blender.

| Ingredients: | |
|---|---|
| Polymer 1 | 0.2-10% wt |
| Polymer 3 (heterophasic polypropylene polymer) | to 100% wt |
| Amount of polymeric vinyl cycloalkane in overall composition | 0.6-32 ppm wt |

Example 4

Preparation of a Composition

The polymers listed below were dry-blended, pellet with pellet, in a small blender.

| Ingredients: | |
|---|---|
| Polymer 2 | 2 or 5% wt |
| Polymer 4 (heterophasic polypropylene polymer) | to 100% wt |
| Amount of polymeric vinyl cycloalkane in overall composition | 6-16 ppm wt |

| % Polymer 1 | Tm | Tc | $T_{1/2}$ |
|---|---|---|---|
| 0 | 163.4 | 117.0 | >40 |
| 0.2 | 165.0 | 122.6 | 28.6 |
| 0.5 | 164.7 | 123.3 | 25.3 |
| 1 | 165.0 | 123.6 | 20.1 |
| 2 | 165.4 | 124.6 | 16.7 |
| 3 | 165.7 | 125.0 | 15.0 |
| 5 | 165.7 | 125.0 | 13.5 |
| 7 | 165.7 | 126.0 | 11.6 |
| 10 | 165.4 | 126.0 | 11.5 |
| 100 | 166.4 | 128.0 | 4.2 |

The results show that polymer compositions comprising heterophasic polypropylene polymer 3 and 0.2-10% wt polymer 1 (i.e. a propylene polymer comprising a polymeric nucleating agent) have comparable Tc to polymer 1.

Figure 2:
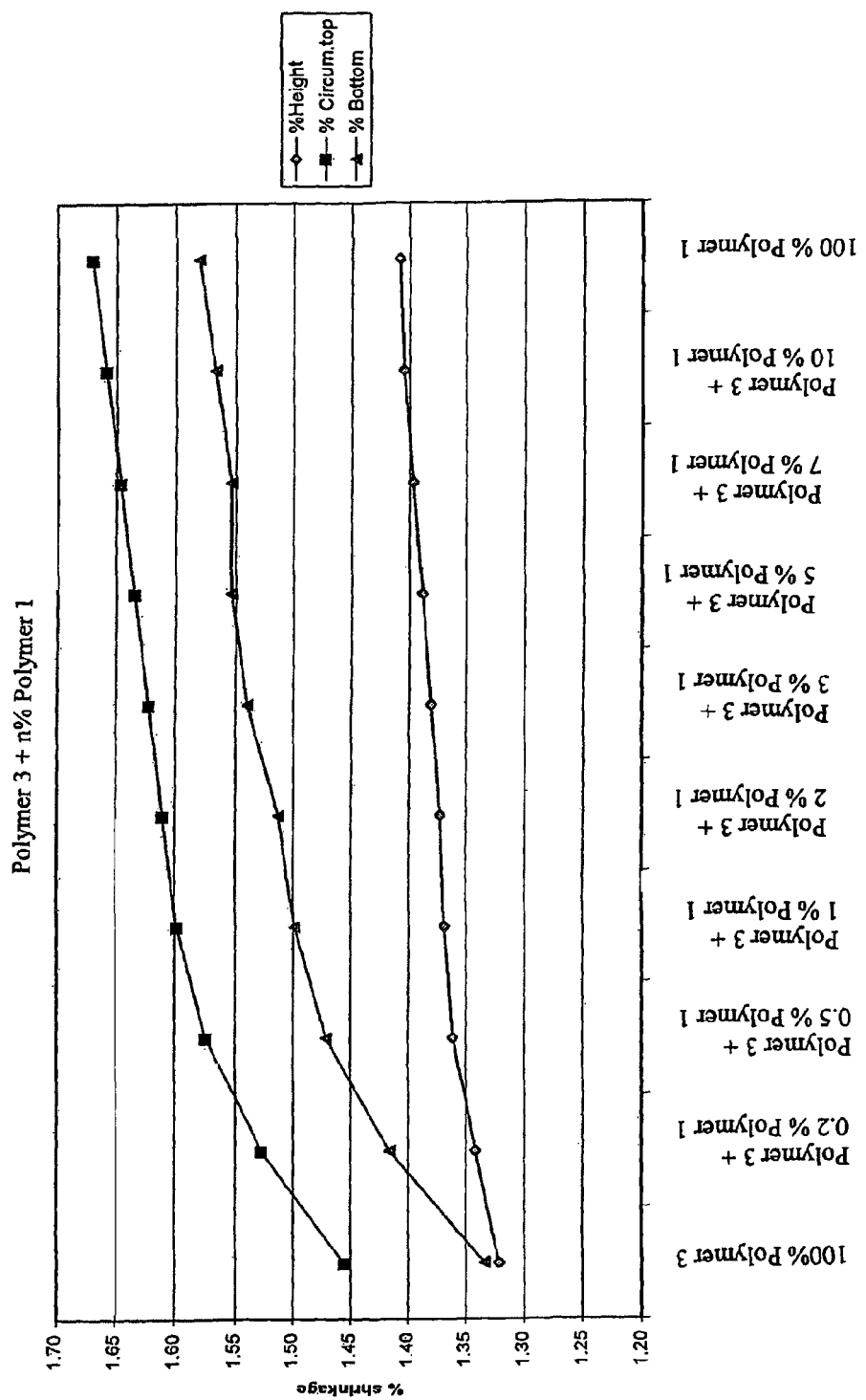
FIG. 2 shows shrinkage of the bucket after cooling as a function of n % Polymer 1 (% height (-◇-), % Circum. top (-■-), % bottom (-Δ-)).

Shrinkage of the bucket after cooling was also determined and the results are shown in the Table below and in FIG. 2.

| % Polymer 1 | Height | % Height | Circum. top | % Circum. top | Bottom | % Bottom |
|---|---|---|---|---|---|---|
| 0 | 248.67 | 1.32 | 823.5 | 1.46 | 717.6 | 1.33 |
| 0.2 | 248.62 | 1.34 | 822.9 | 1.53 | 717.0 | 1.42 |
| 0.5 | 248.57 | 1.36 | 822.5 | 1.57 | 716.6 | 1.47 |
| 1 | 248.55 | 1.37 | 822.3 | 1.60 | 716.4 | 1.50 |
| 2 | 248.54 | 1.37 | 822.2 | 1.61 | 716.3 | 1.51 |
| 3 | 248.52 | 1.38 | 822.1 | 1.62 | 716.1 | 1.54 |
| 5 | 248.50 | 1.39 | 822.0 | 1.63 | 716.0 | 1.55 |
| 7 | 248.48 | 1.40 | 821.9 | 1.65 | 716.0 | 1.55 |
| 10 | 248.46 | 1.40 | 821.8 | 1.66 | 715.9 | 1.57 |
| 100% | 248.45 | 1.41 | 821.7 | 1.67 | 715.8 | 1.58 |

Example 5

Injection Moulded Bucket

The moulding pellets of Example 3 was injection moulded on a Nestal 1570/300 MPS injection moulding machine at 230° C. with an injection speed of 100 mm/s, a holding pressure to 295 grams product weight of bucket and a holding time of 12 s and dosing at backpressure of 100 bar and 150 rpm. The mould temperature was 30° C. on injection side and 15° C. on clamping side. The cooling time was 15 s. The bucket was moulded with one inlet. The dimensions of the mould were: height 252 mm, circumference top 835.7 mm, circumference bottom 727.3 mm.

A bucket of approximate dimensions: height 248 mm circumference top 823 mm circumference bottom 715 mm, wall thickness 1.2 mm was produced.

Tm, Tc and $T_{0.5}$ were determined on the resulting bucket under the following conditions:

Isothermal Crystallisation:

1) Heat from 20° C.-200° C. at 40° C.

2) Hold for 5 minutes at 200° C.

3) Cool from 200° to 140° C. at 10° C./min

4) Hold for 30 minutes at 140° C.

5) Cool 140° C. to 20° C. at 10° C./min

The results are shown in the table below and in FIG. 1

The results show that polymer compositions comprising heterophasic polypropylene (i.e. polymer 3) and 0.2-10% wt polymer 1 (which comprises polymeric nucleating agent) undergo less shrinkage than polymer 1.

Example 6

Injection Moulded Box and Pressed Film

The moulding pellets of Example 4 were injection moulded to form 315 gram boxes on a Nestal 1570/300 MPS injection moulding machine at 230° C. with an injection speed of 100 mm/s, a holding pressure to 315 grams product weight of box and a holding time of 12 s and dosing at backpressure of 100 bar and 150 rpm. The mould temperature was 30° C. on injection side and 15° C. on clamping side. The cooling time was 15 s. The box was moulded with one inlet. The box had approximate dimensions 380 mm×190 mm×100 mm.

A number of samples were taken from the boxes and pressed into films.

Tm, Tc and $T_{0.5}$ were determined on the box and film under the following conditions:

Isothermal Crystallisation:

1) Heat from 20° C.-200° C. at 40° C.

2) Hold for 5 minutes at 200° C.

3) Cool from 200° C. to 134/140° C. at 10° C./min

4) Hold for 30 minutes at 134/140° C.

5) Cool 134/140° C. to 20° C. at 10° C./min

The results are shown in the table below.

|  | Sample prepared | Polymer 4 | Polymer 4 + 2% Polymer 2 | Polymer 4 + 5% Polymer 2 | Polymer 2 |
|---|---|---|---|---|---|
| Tm (° C.) | IM. box | 164.4 | 164.7 | 164.7 | 165.7 |
| Tc (° C.) | IM. box | 123.0 | 125.6 | 126.3 | 127.0 |
| $T_{0.5}$ (min) at 134° C. | IM box | 3.33 | 0.167 | 1.67 | 1.8 |
|  |  | 3.47 | 1.77 | 1.33 | 2.03 |
| $T_{0.5}$ (min) at 134° C. | Film | 3.0 | 1.67 | 1.3 | 2.0 |
|  |  | 3.47 | 1.67 | 1.4 | 2.0 |
| $T_{0.5}$ (min) at 140° C. | Film | 12.1 | 7.8 | 6.3 | 11.9 |
|  |  | 13.8 | 7.8 | 6.1 | 11.8 |

The results show that polymer compositions comprising heterophasic polypropylene (i.e. polymer 4) and either 2 or 5% wt polymer 2 have comparable Tcs to polymer 2.

Figure 3:
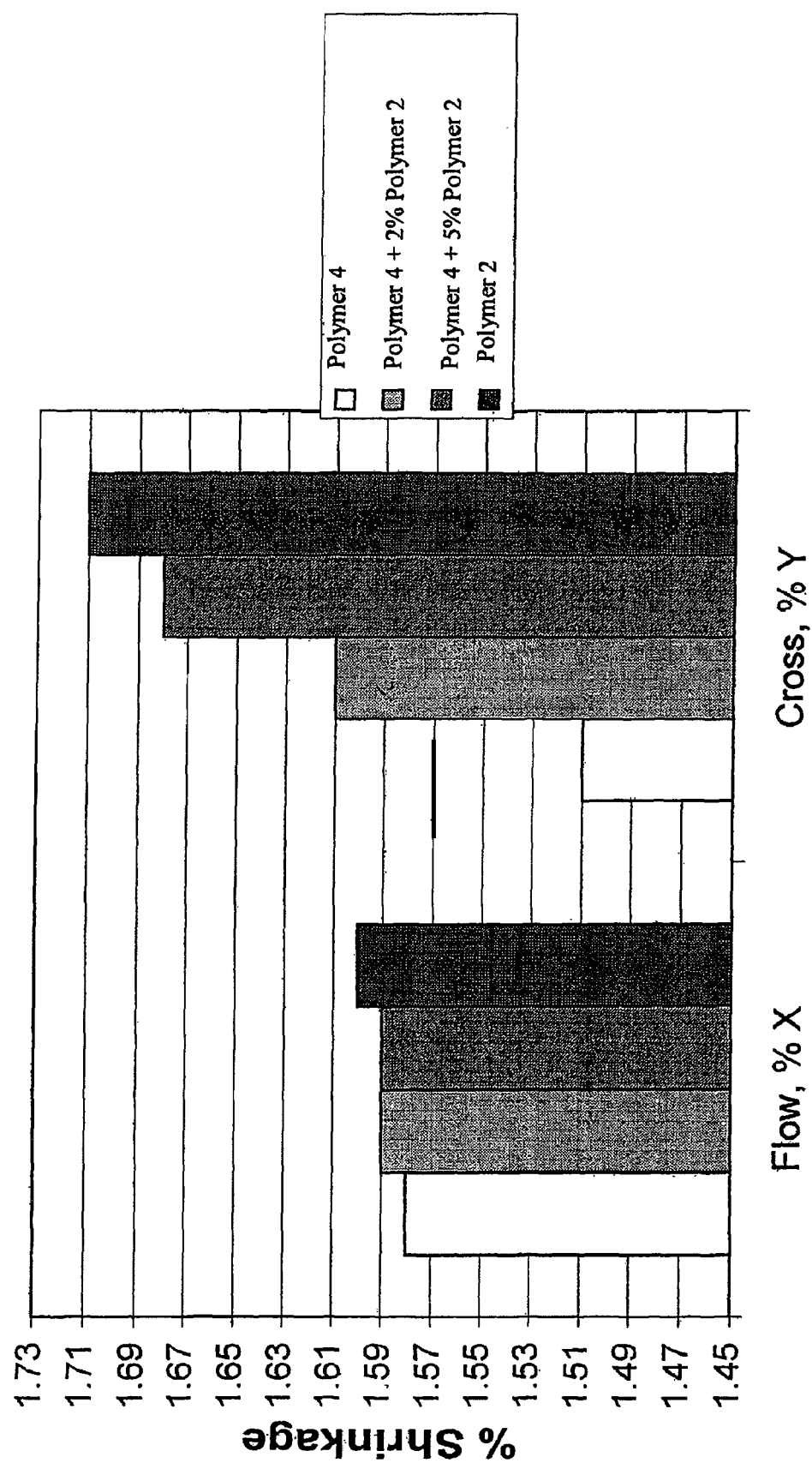
FIG. 3 shows % shrinkage of molded box in the flow and transverse directions for 4 different polymer compositions as shown in the Figure.

Shrinkage of the box during cooling was also measured. As described above, the mould used to make the box had a grid system in the bottom. The samples were therefore measured after 48 hours using a digital reading instrument (DRC600) in flow direction and across the flow direction. Shrinkage was then calculated in percent of the original mould dimensions. The results are shown in the Table below and in FIG. 3.

|  | Flow, % shrinkage | Cross, % shrinkage |
|---|---|---|
| Polymer 4 | 1.58 | 1.51 |
| Polymer 4 + 2% Polymer 2 | 1.59 | 1.61 |
| Polymer 4 + 5% Polymer 2 | 1.59 | 1.68 |
| Polymer 2 | 1.60 | 1.71 |

The results show that polymer compositions comprising heterophasic polypropylene (i.e. polymer 4) and 2 or 5% wt polymer 2 undergo less shrinkage than polymer 2 in both the flow and transverse directions, especially in the transverse direction.

Example 7

Properties of Injection Moulded Bucket

The tensile modulus, top load strength, heat deflection temperature (HDT) and tensile strain yield of the buckets made in Example 5 were determined. For comparative purposes, the same properties of each of the heterophasic polypropylene polymer (polymer 3) and the propylene polymer comprising a polymeric nucleating agent (polymer 1) were determined. The results are shown in the table below.

|  | % polymer 1 | | | | | | | | | |
|---|---|---|---|---|---|---|---|---|---|---|
|  | 0 | 0.2 | 0.5 | 1 | 2 | 3 | 5 | 7 | 10 | 100 |
| Tensile-Modulus (MPa) | 1260 | 1330 | 1360 | 1390 | 1380 | 1400 | 1410 | 1420 | 1400 | 1200 |
| TopLoad | 5090 | 5290 | 4880 | 5240 | 5300 | 5350 | 4990 | 5180 | 5340 | 4420 |
| HDT (° C.) | 84 | 89 | 94 | 96 | 93 | 95 | 97 | 97 | 95 | 91 |
| TenStrainYield | 6 | 6 | 6 | 6 | 6 | 6 | 6 | 6 | 5 | 5 |

The results show that polymer compositions of the invention have better mechanical properties than the heterophasic polypropylene polymer (polymer 3) and the propylene polymer comprising a polymeric nucleating agent (polymer 1) alone.

What is claimed is:

1. A polymer composition comprising:
   (i) 0.01 to 10% wt of a propylene polymer comprising a polymeric nucleating agent, said agent containing vinyl compound units; and
   (ii) a heterophasic propylene polymer which comprises less polymeric nucleating agent than the propylene polymer in (i),
   wherein the weight ratio of (i):(ii) is 10:90 to 1:99.

2. A polymer composition as claimed in claim 1, wherein the heterophasic propylene polymer does not comprise a polymeric nucleating agent.

3. A composition as claimed in claim 1, wherein the amount of polymeric nucleating agent based on the total weight of the composition is 0.01 to 100 ppm wt.

4. A composition as claimed in claim 1, further comprising 0.01 to 10% wt talc.

5. A composition as claimed in claim 1, wherein the amount of (i) is 0.05 to 10% wt.

6. A composition as claimed in claim 1, wherein the amount of (ii) is 85 to 99.95% wt.

7. A composition as claimed in claim 1, wherein the propylene polymer comprising a polymeric nucleating agent is a heterophasic copolymer.

8. A composition as claimed in claim 1, wherein the polymeric nucleating agent is a homopolymer of a vinyl compound.

9. A composition as claimed in claim 1, wherein said vinyl compound units derive from a vinyl compound of the formula (I)

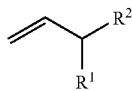

wherein $R^1$ and $R^2$, together with the carbon atom they are attached to, form an optionally substituted, fused ring system or saturated, unsaturated or aromatic ring, wherein said ring system or ring comprises 4 to 20 carbon atoms or $R^1$ and $R^2$ independently represent a linear or branched $C_{4-30}$ alkane, a $C_{4-20}$ cycloalkane or a $C_{4-20}$ aromatic ring.

10. A composition as claimed in claim 1, wherein said vinyl compound units derive from a vinyl compound selected from vinyl cyclohexane, vinyl cyclopentane, vinyl-2-methyl cyclohexane, 3-methyl-1-pentene, 4-methyl-1-pentene, 3-methyl-1-butene, 3-ethyl-1-hexene or a mixture thereof.

11. A composition as claimed in claim 1, wherein said propylene polymer comprising a polymeric nucleating agent is made by modifying a polymerization catalyst with vinyl compounds and using the modified catalyst for the polymerization of propylene, optionally in the presence of comonomers.

12. A composition as claimed in claim 1 having a rate of crystallization which is at least 50% of the rate of crystallization of (i) alone.

13. A composition as claimed in claim 1 having a crystallization temperature which is at least 85% of the crystallization temperature of (i).

14. A process for preparing a polymer composition as claimed in claim 1 comprising blending:
(i) 0.01 to 10% wt of a propylene polymer comprising a polymeric nucleating agent, said agent containing vinyl compound units, and
(ii) a heterophasic propylene polymer which contains less polymeric nucleating agent than the propylene polymer in (i),
wherein the weight ratio of (i):(ii) is 10:90 to 1:99.

15. An article comprising a composition as claimed in claim 1.

16. An article as claimed in claim 15, wherein said article has a higher tensile modulus and/or heat deflection temperature than either (i) or (ii) present therein alone.

17. A process for preparing an article comprising molding, thermoforming or extruding a composition as claimed in claim 1.

* * * * *

UNITED STATES PATENT AND TRADEMARK OFFICE
CERTIFICATE OF CORRECTION

| | | |
|---|---|---|
| PATENT NO. | : 7,923,511 B2 | Page 1 of 1 |
| APPLICATION NO. | : 12/278242 | |
| DATED | : April 12, 2011 | |
| INVENTOR(S) | : Aasetre et al. | |

It is certified that error appears in the above-identified patent and that said Letters Patent is hereby corrected as shown below:

Column 4, Line 13, "up to 20 mmol %." should be changed to --up to 20 mol %.--

Column 6, Line 22, "blended With the matrix" should be changed to --blended with the matrix--

Column 9, lines 33-34, "(the Mark Hoiwinks" should be changed to --(the Mark Houwinks--

Column 9, Line 37, "calibrated with C13NMR" should be changed to --calibrated with C13NMR.--

Column 11, Line 62, "Cool from 200° to" should be changed to --Cool from 200° C. to--

Signed and Sealed this
Eighteenth Day of October, 2011

David J. Kappos
*Director of the United States Patent and Trademark Office*